United States Patent [19]
Marleau

[11] 3,815,272
[45] June 11, 1974

[54] COLLAPSIBLE, TRIANGULAR NET ASSEMBLY

[76] Inventor: Gilles E. Marleau, 85 Brady St., Hull, Quebec, Canada

[22] Filed: Jan. 3, 1973

[21] Appl. No.: 320,744

[52] U.S. Cl. .................................................. 43/12
[51] Int. Cl. ............................................. A01k 77/00
[58] Field of Search ........................................ 43/12

[56] References Cited
UNITED STATES PATENTS

| | | | |
|---|---|---|---|
| 440,568 | 11/1890 | Hebard | 43/12 |
| 1,957,944 | 5/1934 | Dexter | 43/12 |
| 2,683,949 | 7/1954 | Berezansky | 43/12 |

*Primary Examiner*—Hugh R. Chamblee
*Assistant Examiner*—Daniel J. Leach
*Attorney, Agent, or Firm*—Browdy & Neimark

[57] ABSTRACT

A collapsible three sided fishing net, having a handle which combines to form a storage cylinder for the net when it is in collapsed condition. Three solid net-supporting arms cooperate to expand from collapsed parallel position to form a triangle, firmly engaged with a handle. The handle itself serves as a storage holder in one embodiment of the invention, and in a second embodiment a secondary, shorter handle integral with the net supporting arms is also provided. The triangular configuration of the net may be varied, in one embodiment of the invention, depending on the function to which the net is put. In collapsed condition one embodiment of the net is compact enough to be stored in an average-sized tackle box.

4 Claims, 18 Drawing Figures

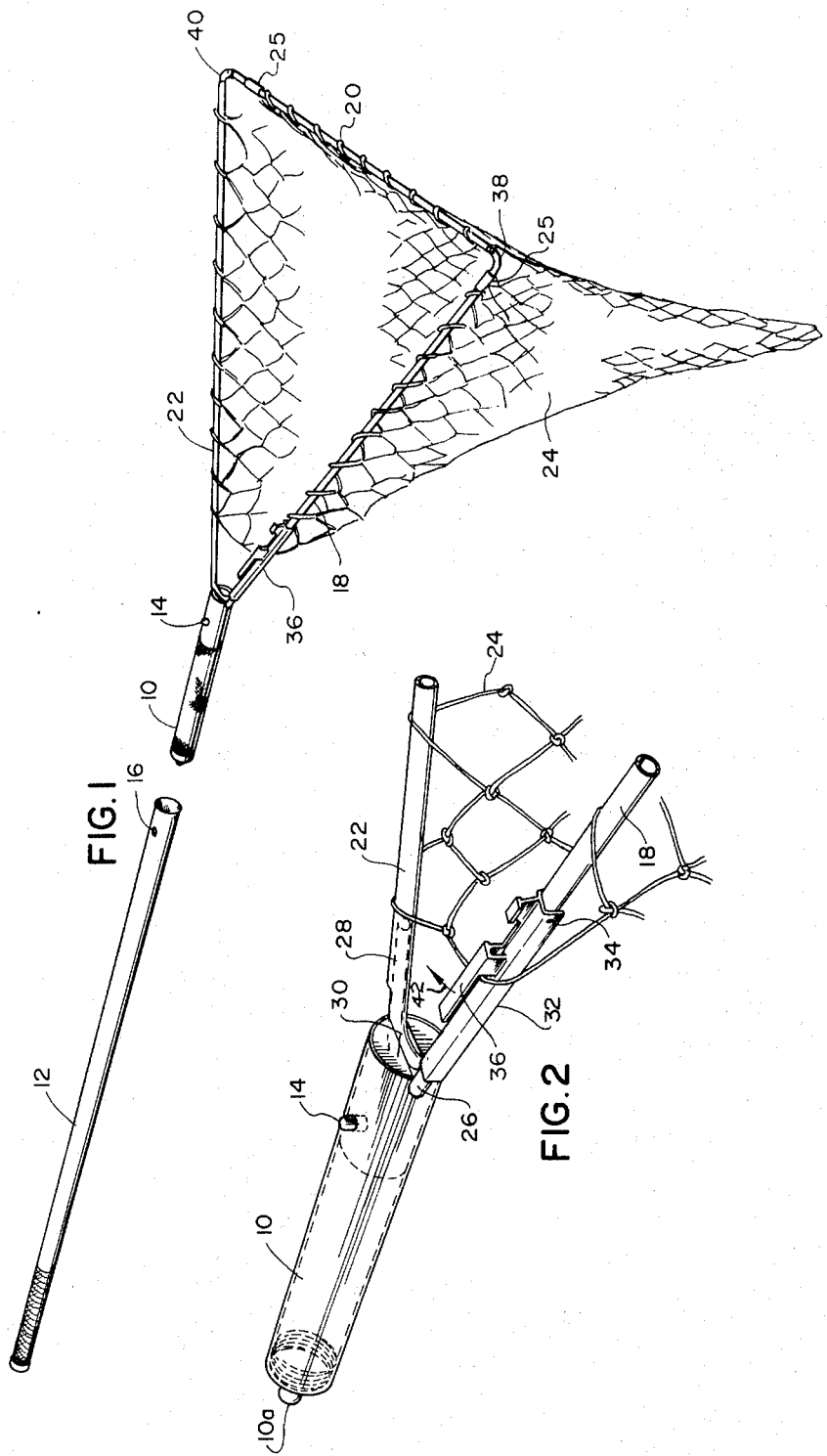

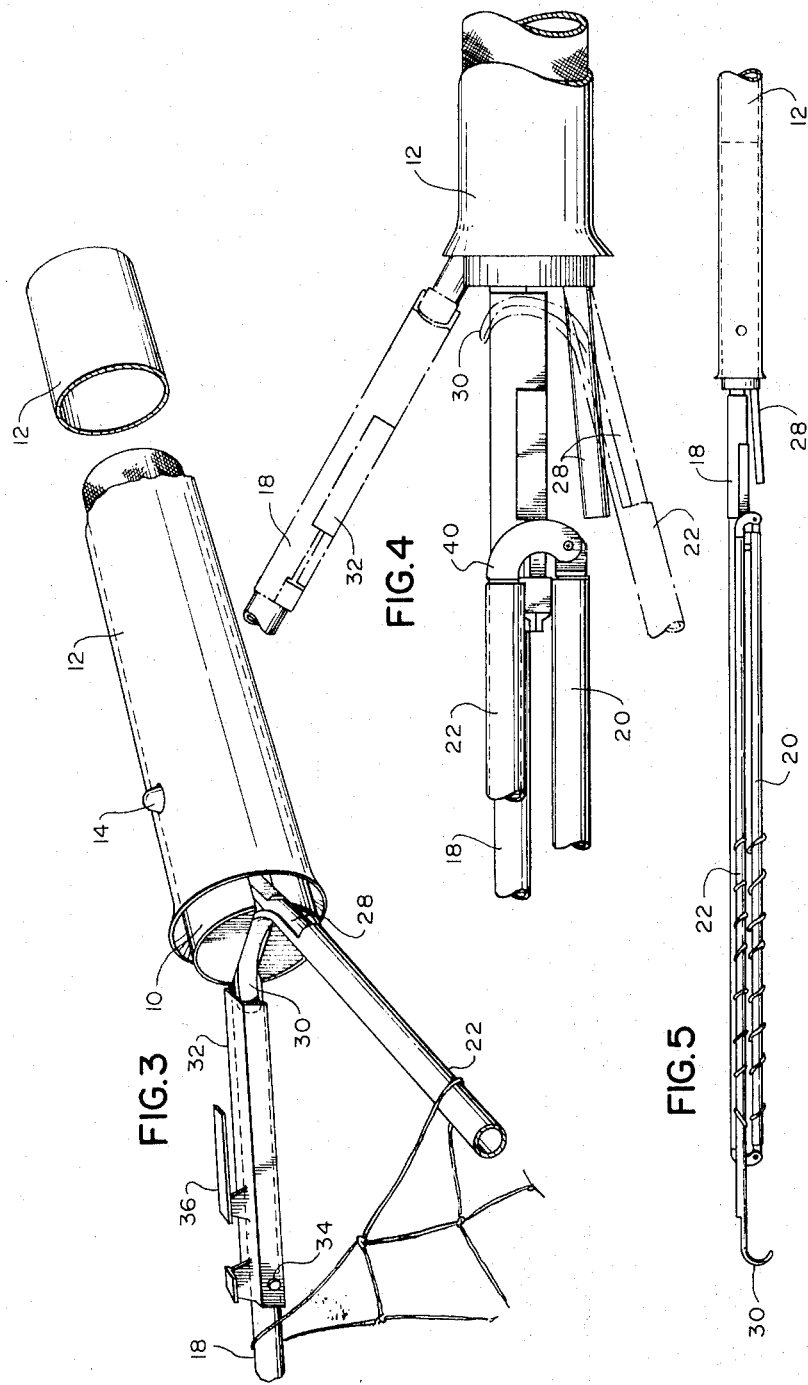

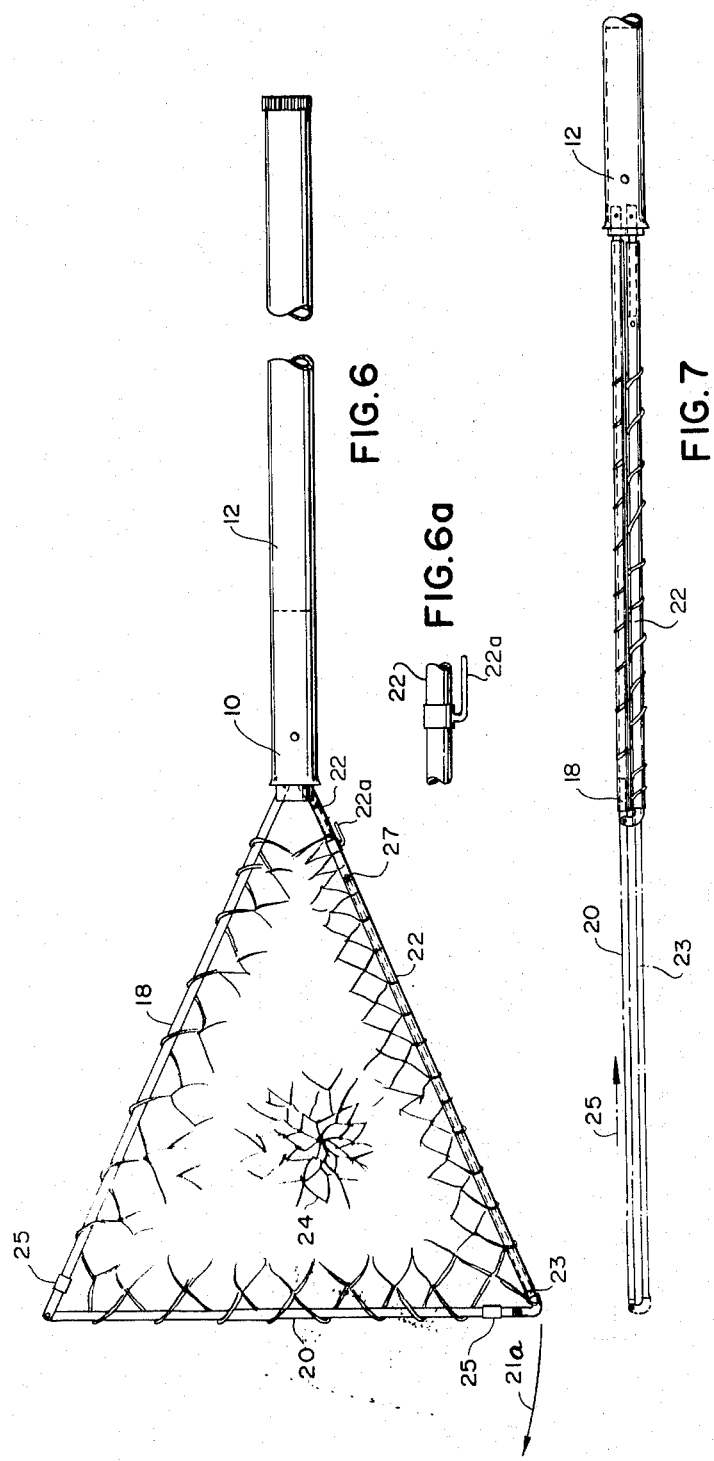

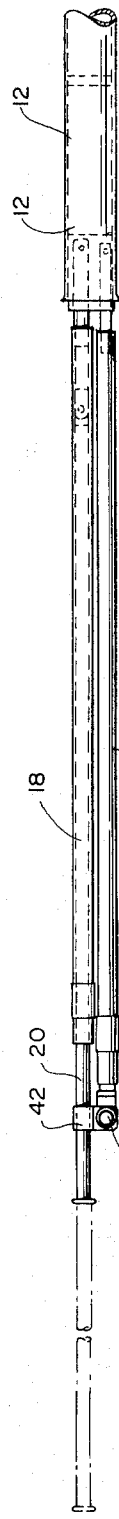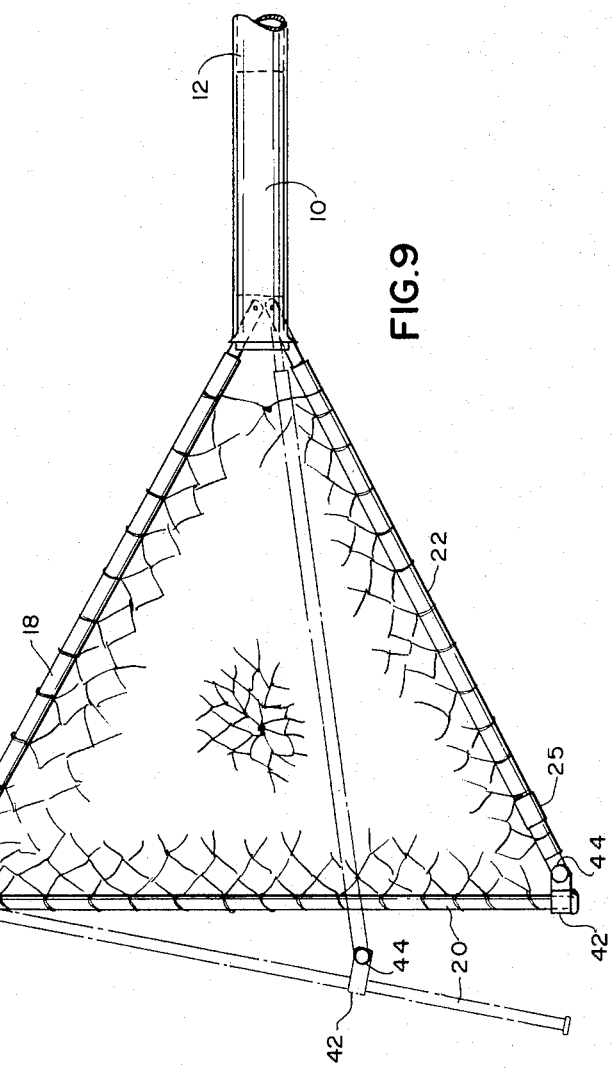

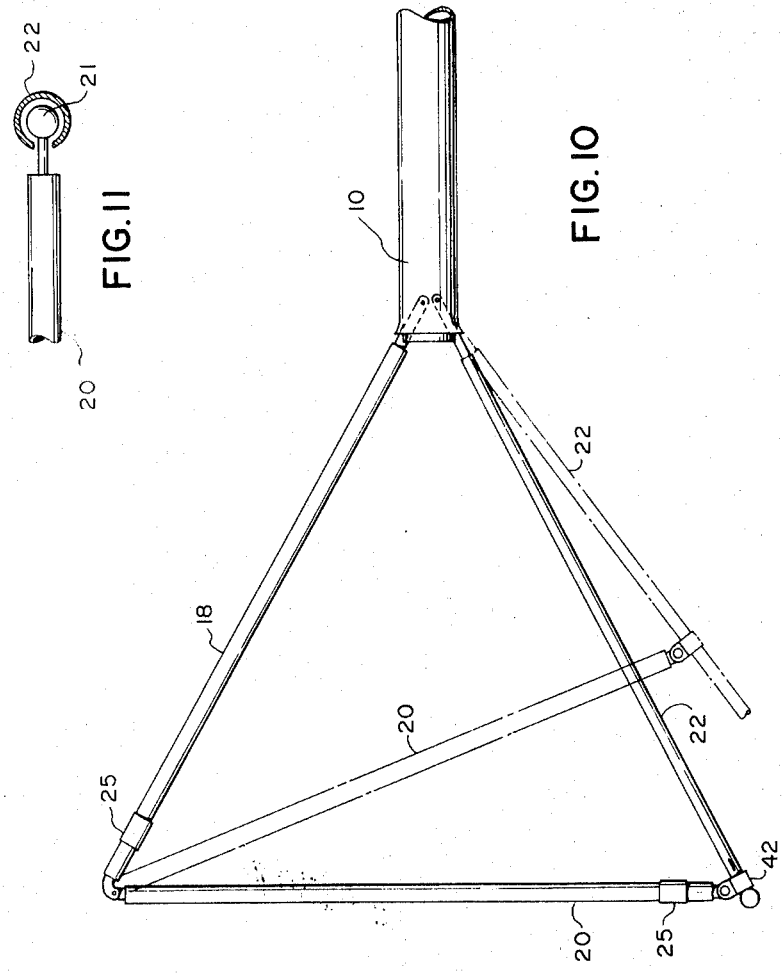

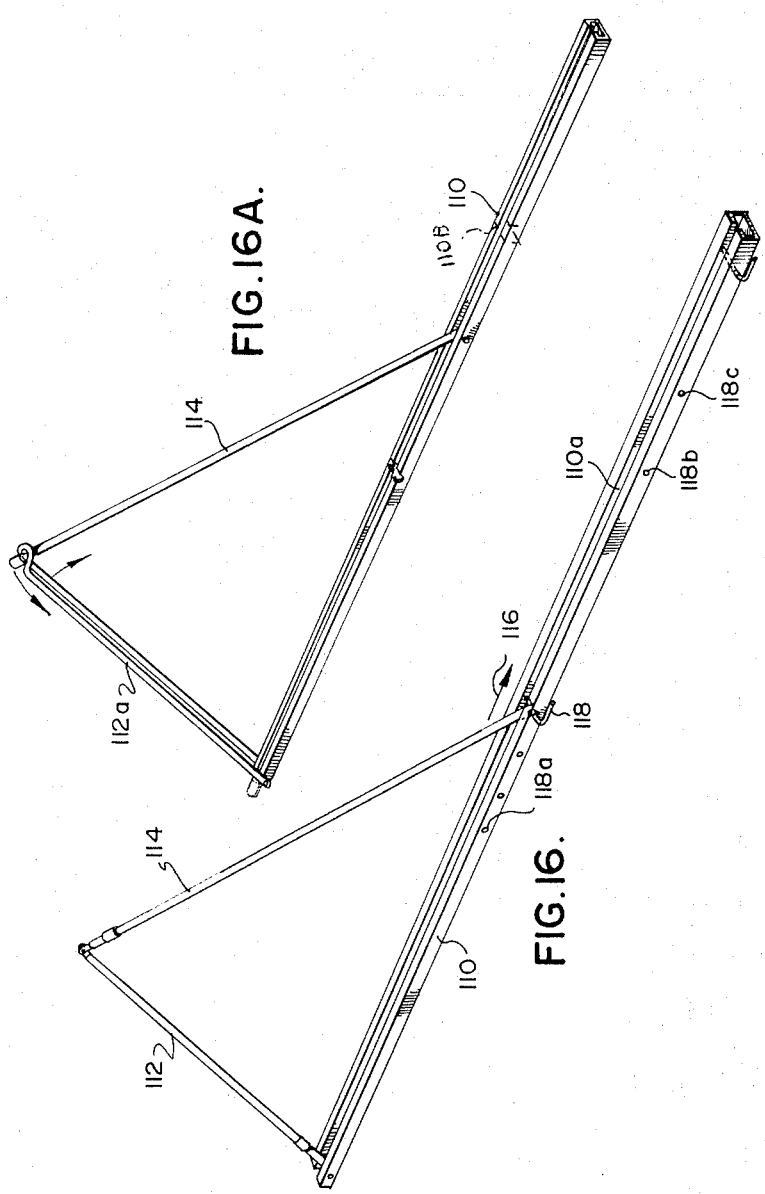

COLLAPSIBLE, TRIANGULAR NET ASSEMBLY

This invention relates to collapsible retractable, or folding nets of triangular configuration, while the net which is disclosed herein has been designed primarily for use by fishermen, it will also find application, for example, in the collection of butterflies, or in aquariums of any size, for use in the collection of minnows, and so on. Thus, the net herein described may be of any dimension, and depending on the application to which the net is to be put, of varying weight and strength.

It is an object of this invention to provide a collapsible fishing net which in collapsed or storage position is contained within a tube of relatively small diameter, and in operable condition provides a triangular fishing net of relatively large dimension.

It is a further object of the invention to provide a fishing net of a collapsible structure, the storage tube thereof serving as an elongate handle, at the option of the fisherman, and which also includes a convenient short handle integral with the net.

A further object of the invention is to provide a fishing net of a collapsible structure which when in its storage tube takes little space, and is very compact and convenient, because it eliminates the net from getting tangled with other fishing gear when on a fishing trip. It is also convenient for a portage between lakes, on a hike, and can be placed anywhere in a car, boat or airplane, taking little space compared to all the space taken by an ordinary fishing net of the same size. The invention includes an embodiment of a fish net small enough, when collapsed, to be stored in the average tackle box.

A further object of the invention is to provide a collapsible fishing net which does not require the use of complex springs or the like.

A still further object of the invention is to provide a collapsible fishing net of simple construction, which permits quick assembly for use and equally rapid disassembly for storage.

A further object is to provide a collapsible fishing net comprising in combination: a cylindrical storage-handle; a relatively short handle member adapted to be telescopically received within said storage-handle; three cooperating arms adapted to form a triangle to support a fishing net, with the apex of said triangle being at one end of said short handle and the base thereof being geometrically remote therefrom; at least one of said arms being pivotally engaged with said end of said handle at the apex of said triangle and at least one of said arms so engaged being hingedly connected to one end of the arm forming the base of said triangle; one of the corners of said triangle incorporating means whereby adjacent arm ends may be selectively coupled together or separated; whereby said arms may be selectively positioned to form a triangle to support a fishing net and selectively folded into side-by-side relationship and telescopically inserted within said storage-handle.

In the past, attempts to construct collapsible fishing nets having a triangular frame configuration primarily involved the use of a pair of pivoted arms, with a chain or cable connecting the two arms, remote from the fish net handle, to permit ready folding of the net for storage. A principal disadvantage of all prior art collapsible fishing nets is lack of strength and stability during use, and the subject invention eliminates this major disadvantage.

Reference will now be made to the drawings wherein:

FIG. 1 is a perspective view of one embodiment of the invention;

FIG. 2 is a detail perspective in enlarged scale;

FIG. 3 is a further detail perspective in enlarged scale;

FIG. 4 is a top plan of the pivot portion of the fish net, in closed position in solid lines and in open position in dotted lines;

FIG. 5 is a plan view of the fish net in collapsed position;

FIG. 6 is a plan view of an alternative embodiment of the invention;

FIG. 6a is a detail of a hook used in the embodiment of FIG. 6;

FIG. 7 is a plan view according to FIG. 6, with the fish net in closed position;

FIG. 8 is a plan view of a still further embodiment of the invention in closed position;

FIG. 9 is a top plan view according to FIG. 8 with the fish net in open position;

FIG. 10 is a top plan view of a further embodiment of the invention;

FIG. 11 is a fragmentary view of an alternative to the collar arrangement of FIG. 10;

Figure 12:
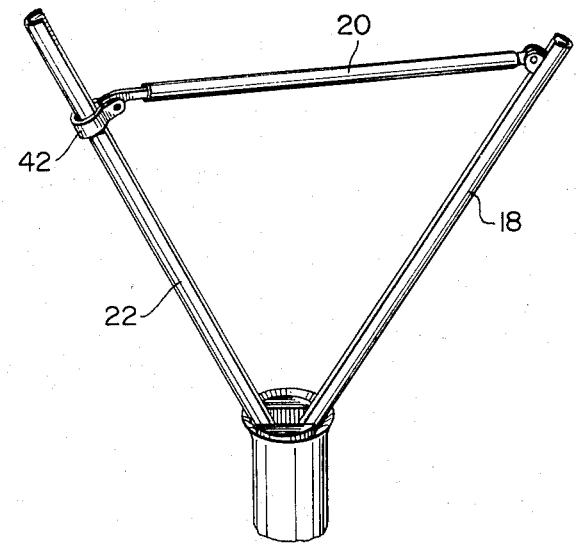
FIG. 12 is a diagrammatic, perspective view of a modified version of the net of FIG. 10.
Figure 15:
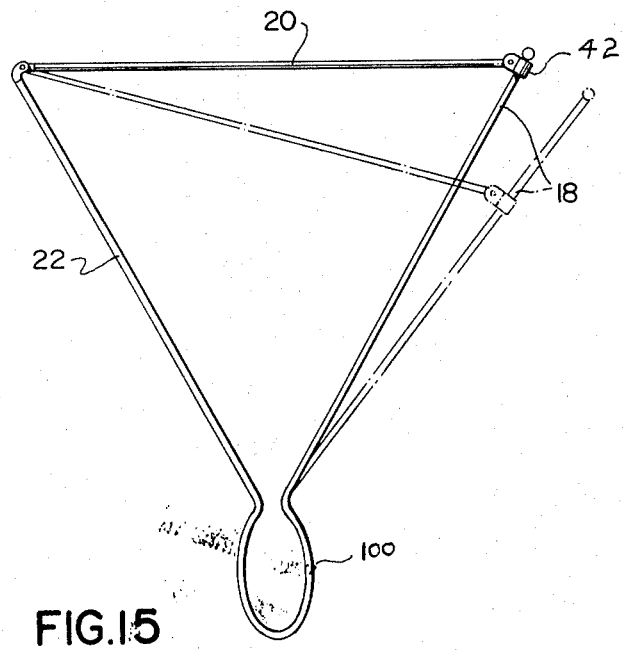

FIG. 15, shown on the sheet bearing FIG. 12, is a plan view of a still further embodiment;

FIG. 16 is a plan view of still another embodiment; and

FIG. 16a is a perspective view of an alternative to the embodiment of FIG. 16.

Detailed reference will now be made to the drawings wherein like reference numerals will identify like parts.

Referring to FIGS. 1 and 2, a fish net is illustrated having a relatively short integral handle member 10, which is desired to be received within a hollow tubular storage-handle 12. Handle 10 is provided with a spring urged stop member 14 adapted to be received by hole 16 in handle 12, when short handle 10 is inserted therewithin.

A collapsible, triangular, fish net frame is comprised of three arms 18, 20 and 22 which cooperate to support fish net 24, and to form an approximate equilateral or isosceles triangle, as desired. Arm 18 is permanently, pivotally mounted at the forward end of handle 10, at 26. Also permanently, pivotally mounted at the forward end of handle 10 is a short cylindrical member 28, adapted to be engaged within the end of tubular arm 22. Both arm 18 and member 28 may be conveniently riveted to or with the end of handle 10. As is most clearly seen in FIG. 4, arm 22 terminates in a hook-like projection 30. This curved projection serves to lock the fish net in open position, as it is engaged by locking member 32 pivotally mounted on arm 18. Projection 30 also permits the triangle to be opened, if it is desired to remove a net which has become worn, or to replace net 24 with a net of any desired alternative size.

Referring both to FIGS. 2 and 3, it will be seen that locking member 32 is pivotally mounted on arm 18 by means of a rivet or the like 34. Member 32 may be provided with a snap fit on arm 18, at the end remote from rivet 34. Thus, locking member 32 may be pivotally raised at its end remote from rivet 34, to free hook 30 when it is desired to disassemble the fishing net, for storage, as will be explained in detail hereinafter. Also provided on locking member 32 is a hook-like projection 36, adapted releasably to engage net 24, as is illustrated in FIG. 2. Projection 36 may also be utilized to reduce the size of a net, by hooking the net, rear its bottom end, on hook 36, whereby a net of approximately half the depth will be achieved. For example, referring to FIG. 1, where net 24 is illustrated as having relatively great depth, as is required for large fish, a smaller net is more convenient if a relatively small fish is being netted. Thus, by securing the inside bottom portion of the net on hook 36 a more convenient net size is achieved.

Arms 18 and 20 are hingedly connected at 38, while arms 20 and 22 are hingedly connected at 40, the hinge construction being most clearly illustrated in FIG. 4. It will be understood that any suitable hinge may be employed.

Referring now to FIGS. 3, 4 and 5, disassembly from the position illustrated in FIG. 1 is as follows. Hook 30 which is engaged by locking member 32 is freed by upwardly pivoting locking member 32 in the direction of arrow 42 (see FIG. 2). Referring back to FIGS. 3, 4 and 5, arms 18 and 22 are illustrated in open position in broken lines, and in collapsed position in solid lines. After hook 30 is released from within locking member 32, arm 22 is pulled forwardly away from handle 10, so that short arm 28 is released from within cylindrical arm 22. Fish net 24 is then freed from hook 36 on locking member 32, so that arm 22 may be swung on hinge 40 until it is beside arm 20, and the fish net 24 will have collapsed. Arm 20 is then swung on hinge 38 (along with arm 22), until all three arms are in side-by-side relationship as illustrated in FIGS. 4 and 5.

While the fish net is not illustrated in FIGS. 4 or 5, at this point the net will be completely collapsed, and dangling beneath the three arms. The end of fish net 24 may now be engaged in hook 36, and the entire assembly pushed telescopically into storage handle 12. If the dimension of the fish net being employed is relatively large, it will be convenient to engage the bottom portion of net 24 in hook 36 at a point removed from the bottom thereof, in order that all of the net will be evenly distributed along the arms, and thus all contained within storage handle 12.

If desired, a closure cap of any known construction may be provided to seal storage handle-container 12. The closure cap may conveniently be provided with a belt loop, or ring, to facilitate transportation. The closure cap which is removed while the net is being assembled will also conveniently be adapted to fit the opposite end of storage handle 12 while the net is in use, thus preventing inadvertent loss of the closure cap. It is further desirable that the end of storage handle 12 in which handle 10 is engaged is slightly flared to facilitate entry of handle 10 therewithin, and subsequent entry of the net arms and the net itself.

As seen in FIG. 5 hook 30 on arm 22 projects slightly beyond arms 18 and 20. Thus, in storage position hook 30 will be at the mouth of storage handle-container 12, to facilitate pulling of the net assembly out of storage handle 12 and into operative position. Assembly follows the reverse of the steps outlined above as the fishing net is collapsed; that is, when the three arms 18, 20 and 22 have been pulled from within storage handle 12 to the position shown in FIG. 5, arms 22 and 20 are swung on hinge 38, then arm 22 is swung on hinge 40 until it is engageable with pivoted cylindrical projection 28, after which hook 30 is locked by locking member 32 on arm 18.

The exterior surface of storage-handle 12 and short handle 10 may be suitably roughened to provide useful friction during use, and if desired short handle 10 may be of hollow construction with a cap at its end remote from the fish net, for storage of fishing apparatus such as a knife, fishing lures, leaders, hooks, sinkers, or even a light alternate minnow net or a replacement net for use on the frame of the subject net. The length of the handle 10, may be of course varied according to tne storage requirement placed on it.

Handle 10 is provided with a threaded plug 10a, which may also be equipped with a wrist strap, not illustrated, as is standard with fishing nets, or plug 10a may be otherwise suitably locked at the end of handle 10.

An alternative embodiment of the invention is illustrated in FIGS. 6 and 7. In this embodiment arms 18 and 22 are pivotally mounted at the end of short handle 10 in the same manner as the first embodiment described above. Arm 22, however, is cylindrical, and an interior tubular arm 23 is engaged therein, telescopically. Arm 20 and arm 18 are hingedly engaged, and arm 20 is adapted to be telescopically received with cylindrical arm 18. As illustrated in FIG. 6 arm 22 is telescopically engaged with an interior arm 23, which is retained in position by means of a spring urged stop 27. To disassemble the net of FIGS. 6 and 7 stop 27 is depressed to release interior arm 23, when it may be slidably extended in the direction of arrow 21a, while arm 20 simultaneously pivots on arm 18 until interior arm 23 is in side-by-side parallel relationship with arm 20, in the position illustrated in FIG. 7. Arms 20 and 23 may then be telescopically engaged within arms 18 and 22, respectively, to the position illustrated in solid lines in FIG. 7. The net assembly may then be inserted, again telescopically, into handle 12. Similarly, the reverse to the above procedure will open the triangular net, that is, arms 20 and 23 are telescopically pulled away from arms 18 and 22, respectively, to the position illustrated in broken lines in FIG. 7, at which point arms 18 and 20 are pivoted away from arms 22 and 23, as arm 23 is simultaneously telescoped back into arm 22, until the position shown in FIG. 6 is achieved, when spring lock 27 will again firmly maintain the net assmebly in open position.

As illustrated in FIG. 6a a hook 22a is mounted on arm 22, and is adapted to engage the interior corner of fish net 24 when the net is in use. Hook 22a is positioned adjacent to handle 10, and may be used to engage the bottom of net 24 as the assembly is being telescopically inserted into handle 12, or, as already described above, to reduce the size, that is, the depth of the net, depending on the size of fish being netted.

A still further embodiment of the invention is illustrated in FIGS. 8 and 9. Arm 18 is pivotally engaged with handle 10, and arms 18 and 20 are hingedly connected, in the manner described above. However, arm 22 is also pivotally connected to handle 20 in the same manner as arm 18, and at its opposite end terminates in a sliding collar 42 which is engaged on arm 20. Collar 42 is pivotally mounted at the end of arm 22, for example by a thumb screw 44, or by any other suitable lock, such as the well known umbrella spring lug lock. Arm 20 is of a smaller diameter than arm 18, and arm 18 is a hollow cylindrical construction. Hinge 38 is connected with a plug contained within arm 18.

The fishing net is shown in solid lines in FIG. 9 in operable position. To collapse the net for storage, thumb screw 44 is loosened, thus enabling arm 22 to be moved along arm 20, collar 42 sliding therealong, as illustrated in broken lines, until arm 22 is beside and close to arm 18. Arm 20 may then be telescopically engaged within arm 18, as illustrated in broken lines in FIG. 8. A suitable hook, such as hook 22a illustrated in FIG. 6a is provided on either of arms 18 or 22, for engagement with the end of fish net 24, when the net arms are in collapsed position, and before telescopic engagement within storage handle 12. The arm and net assembly may then be telescopically pushed into storage handle 12, for storage.

In the embodiment illustrated in FIG. 10, end arm 20 is provided with collar 42, for slidable engagement on arm 22, rather than as in the embodiment of FIGS. 8 and 9, where collar 42 is provided on side arm 22. Telescoping engagement of one of the arms is eliminated in this embodiment, as arm 20 simply slides down arm 22, and is illustrated in a half-way position, in broken lines. When collar 42 on arm 20 has reached the base of arm 22 adjacent handle 10 it will be appreciated that the three cooperating arms will then be positioned close together, ready for storage, without the need of one of the arms being telescoped, as in the case of arm 20 in the embodiments of FIGS. 8 and 9.

Arms 20 and 18 are pivotally attached together, and are relatively rotatable. That is, the hinge uniting arms 20 and 18 in the embodiment of FIG. 10 permits slight pivoting so that when the arms are in collapsed position their relative position, in cross-section, is triangular. Thus, the arms are more readily received within storage handle 12, that is, the circular interior configuration of storage handle 12 is readily able to accommodate the net frame member, together with the net itself.

A still further embodiment is illustrated in the fragmentary view of FIG. 11, wherein arm 22 is provided with an interior longitudinal slot adapted slidably to receive a projection 21 on the end of arm 20. It will be understood that the slot may be provided in arm 20, or in arm 18, as desired, and the closing and opening of the net arms will be accomplished in the same manner as has already been described in connection with the embodiments of FIG. 10.

With the embodiments illustrated in FIGS. 10 and 11 it will be appreciated that collar 42 may be detached from arm 22, and the net collapsed accordingly, in precisely the same manner as has already been described. If collar 42 is designed to be removed from arm 22, a disadvantage of the structure of FIG. 10 could be avoided, namely, difficulty in sliding collar 42 along arm 22 in the event that arm 22 should be dented or bent, during heavy use. Similarly, the arrangement described above in connection with FIG. 11 would avoid the disadvantage of slit tube 22 becoming dented or bent, if projection 21 were removable from the end of arm 22, for collapsing and subsequent storage.

There has been reference above to the engagement of the bottom end of fish net 24 with hook 22a illustrated in FIG. 6a, or hook 36 illustrated in FIGS. 1 and 2. If it is desired to reduce the dimension of the fish net during use the bottom of the net will be engaged within either hook 36 or hook 22a, by raising the bottom of the net centrally upwardly from the inside until the hook can be engaged. When the net is being inserted within storage handle 12 the bottom of the net will not be engaged in either hook 36 or hook 22a, until the net frame has been collapsed, thus, engagement of the net with the hook will be from the exterior, when the net frame is in collapsed position. In the event that a net of large dimensions is being used it will of course be necessary to engage the net with the hook at a point removed from the apex, so that the net will not be effectively longer than the length of the storage handle, and thus fully contained within the storage handle when the complete net assembly has been telescopically pushed therein.

In the diagrammatic embodiments of FIG. 12 arms 18 and 22 are half circles, in cross-section, that is, each of these arms have the configuration of an elongate semi-circular trough, and in closed position form a split cylinder. It will be seen that when collar 42 hingedly connected at the end of arm 20 is slid downwardly along arm 22 that arms 18 and 22 will close together, and arm 20 will be contained therebetween. Thus, in this embodiment a very small diameter storage handle can be used, in order to store a net of relative large dimension.

Figure 13:
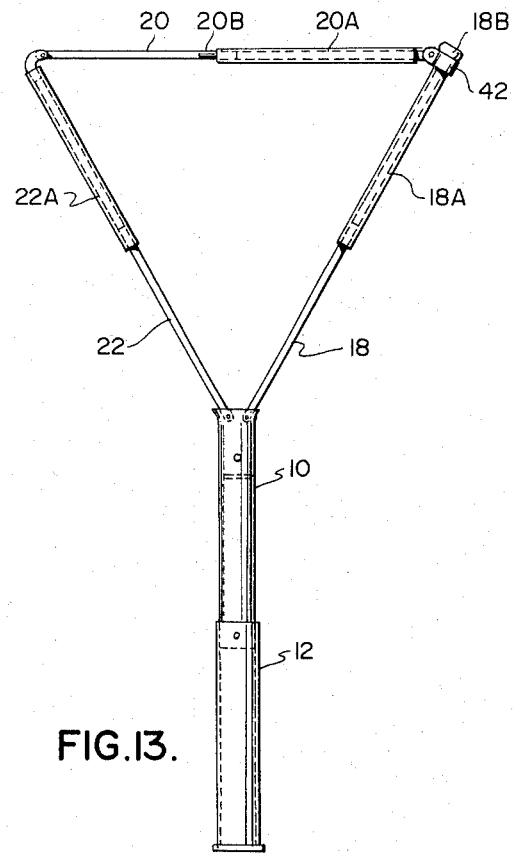
FIGS. 13 and 14 are plan views of a still further alternative embodiment.
Figure 14:
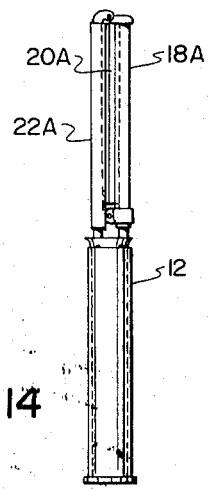

In the embodiments of FIG. 13 a collapsible net which is extremely compact in its collapsed or storage position, is illustrated. A pair of arms 18 and 22 are hingedly connected to handle 10, in the manner already described. Arms 18 and 22 are adapted for telescopic engagement within hollow extensions 18a and 22a respectively. Similarly, arm 20 which is hingedly engaged at one end to telescopic arm 22a is adapted for engagement within hollow cooperating telescopic member 20a. Member 20a is provided with a collar 42, pivotally connected at the end thereof remote from arm 20, and is slidably engaged on arm portion 18a, in the same manner as has already been described above, for example, in connection with the embodiments of FIGS. 9 or 10. Arm 18a is provided with a stop at the end thereof, by way of a small flange, or enlarged portion 18b. The triangular arm assembly is locked in position by means of a locking device on arms 18, 20 and 22, such as a small thumb screw or the like indicated at 20b. Alternative locking means, not illustrated, such as telescopic squeeze lock as found in rod antennas, spring urged buttons, umbrella spring lug, or collett locks may be used as will be evident to one skilled in the art. This assembly from the position shown in FIG. 13 to the position shown in FIG. 14 involves loosening of lock 20b, then telescopic arm portion 20 into arm portion 20a, then telescoping arm portions 22a and 18a over arm portions 22 and 18 respectively, and finally sliding collar 42 down arm 18a, to the position illustrated in FIG. 14. The arm and net assembly may then conveniently be telescopically inserted into the storage handle 10. In this embodiment it will be realized that a net of considerable dimension may be formed, and yet in storage the net is of greatly reduced length, to facilitate transportation, for example, in a kit box or the like. Further short handle 10 may be lengthened by telescopically extending outer storage handle 12.

Referring now to FIG. 15 arms 18 and 22 are integrally connected at the apex of the triangle formed by arms 18, 20 and 22, and are constructed of spring steel or the like. A spring steel hinge indicated at 100 permits arms 18 and 22 to be closed toward each other, and spring hinge 100 normally urges arms 18 and 22 to open position. Suitable locking means are provided on arm 18 to cooperate with collar 42, as already discussed. Arm 20 will move from the open position shown in dotted lines in FIG. 15, collar 42 sliding downwardly along arm 18, until arms 18, 20 and 22 are positioned side-by-side, when the entire assembly may then be telescopically engaged within any suitable storage container.

Two further embodiments of the invention are illustrated in FIGS. 16 and 16a. Turning firstly to the embodiment of FIG. 16, a combination handle 110 also forms one side of a net supporting triangle. A net supporting arm 112 is pivotally mounted at one end of handle 110, at one of its ends, and at its other end is pivotally connected to net arm 114. Arm 114 is adapted to be slid within trough 110a of handle-arm 110, in the direction of arrow 116, to close the assembly. The net itself is not illustrated, for purposes of simplicity. A locking member which may be spring loaded is illustrated at 118, and it will be seen that the shape of the triangular net supporting assembly may be altered by positioning lock 118 at alternative locations illustrated at 118a, b and c. Thus, the lock which may be placed at various points, selectively by the user, along arm 110 permits the net to become adjustable as to size, and to have a triangular configuration of many different shapes depending on the requirements to which the net will be put, for example, a large opening can be used effectively if minnows are being caught for bait, but on the other hand, if a large fish is being netted, pivoted arm 114 may be slid in the direction of arrow 116, until the net is effectively locked shut, with a fish therein.

In the embodiment of FIG. 16a arm 114 is also slidably engaged in handle-arm 110, at one of its ends and is engaged within a U-shaped end arm 112a, at its other end whereby arm 114 slides within the U formed by arm 112a, toward handle-arm 110, when the net assembly is being closed, and arm 112a pivots downwardly to handle-arm 110.

In the embodiments of FIGS. 16 and 16a, as well as in the embodiment of FIG. 6, it will be appreciated that the net itself is provided with sufficient extra size, so that it will not prevent ready closing of the arm assemblies. In other words, a net is provided which is slightly over-sized, but whereby it is slightly bunched on the arms, so that it will stretch to full size as the assemblies are put into storage position.

The embodiments of FIGS. 16 and 16a are illustrated by way of example only, and it will be realized that alternative structures already described herein may be substituted for the sliding-trough handle-arm. In other words, for example, the split-tubular arrangement of FIG. 12 could be used for arms 112 and 114 of FIGS. 16 and 16a with the handle-arm being similarly configured for at least a portion of its length sufficient to accommodate arms 112 and 114.

In the embodiment of FIG. 16a, moreover, the portion of handle 110 extending beyond arm 114 may be shortened, as shown in broken lines at 110b to provide a more compact unit. As already described, the short handle portion of handle-arm 110 may be provided with a hand grip, and also be engaged within a longer storage-handle when a long-handled assembly is desired. Further, arms 112 and 114 could themselves be telescopic, in the manner of the embodiment illustrated in FIG. 13, whereby a still more compact collapsed net assembly is achieved. Further, all of the pivoting, locking and storage contrivances already described in connection with FIGS. 1 through 14 may readily be embodied in whole or in part in the structure of FIGS. 16 and 16a.

As illustrated in FIGS. 1, 6, 9 and 10 of the drawings, net restraining clips 25 are provided on the arm assembly, and these clips 25 may be of any desired configuration, so long as the net may be restrained from movement on the associated arm, to ensure that the net remains firmly in position on the arm assembly, while the net is in use. The clips illustrated are simple spring clips which snap on an associated arm, but it will be appreciated that clips of a permanent type may be integrally formed on the arm assembly.

It will be appreciated that where reference has been made herein to cylindrical arms, be they telescopic or otherwise, that other geometric cross-sectional configurations of the arms may be employed, such as square, rectangular, oval, triangular, or as described.

An incidental feature of the net according to the invention, when it is used in combination with the storage elongate handle, which is closed at its end remote from the net structure, is that the net will float, should it be inadvertently dropped into the water.

The foregoing is by way of example only, and the invention should be limited only by the scope of the appended claims. I claim:

1. A collapsible, triangular net assembly including a handle and three relatively inflexible net-supporting arms;
    each of the first and second of said net-supporting arms being pivotally attached at one end to said handle;
    the third of said net-supporting arms being pivotally attached at one end to the other end of said first arm;
    the third and second of said arms being slidably engaged one with the other;
    whereby said three arms may be selectively open to form a net-supporting triangle;
    and said arms may be closed into close, side-by-side parallel relationship by sliding one of said second or third arms toward one end of said first arm.

2. A collapsible, triangular net assembly according to claim 1, said first and second arms being U-shaped in cross section, whereby when said arms are closed into side-by-side parallel relationship, the third of said net-supporting arms is contained between and within said first and second arms.

3. A collapsible, triangular net assembly according to claim 1, said second and third arms being slidably engaged one with the other, by the provision of a ball-extension at the end of one of said arms, slidably engageable within a slit provided in the other of said arms, which is configured as a longitudinally slit cylinder.

4. A collapsible, triangular net assembly according to claim 1, the third and second of said arms being slidably engaged one with the other, by means of a sliding collar provided at the end of one of said arms, adapted to slidably surround the other of said arms.

* * * * *